United States Patent
Van Niekerk et al.

(10) Patent No.: US 10,421,155 B2
(45) Date of Patent: Sep. 24, 2019

(54) METHOD FOR PRODUCING A COMPONENT CONNECTION FROM TWO DIFFERENT MATERIALS, AND A CORRESPONDING COMPONENT CONNECTION

(71) Applicant: Bayerische Motoren Werke Aktiengesellschaft, Munich (DE)

(72) Inventors: Johann Van Niekerk, Munich (DE); Hans Langrieger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 506 days.

(21) Appl. No.: 15/153,005

(22) Filed: May 12, 2016

(65) Prior Publication Data

US 2016/0256958 A1  Sep. 8, 2016

Related U.S. Application Data

(63) Continuation of application No. PCT/EP2015/051298, filed on Jan. 23, 2015.

(30) Foreign Application Priority Data

Feb. 13, 2014 (DE) .................. 10 2014 202 629

(51) Int. Cl.
   *B23K 26/323* (2014.01)
   *B23K 26/26* (2014.01)
   (Continued)

(52) U.S. Cl.
   CPC ............ *B23K 26/323* (2015.10); *B23K 26/03* (2013.01); *B23K 26/242* (2015.10); *B23K 26/26* (2013.01);
   (Continued)

(58) Field of Classification Search
   CPC .... B23K 26/323; B23K 26/242; B23K 26/03; B23K 2201/006
   (Continued)

(56) References Cited

U.S. PATENT DOCUMENTS

| 4,924,063 | A | * | 5/1990 | Buchel | .................. | B23K 26/04 |
| | | | | | | 219/121.64 |
| 2004/0052574 | A1 | * | 3/2004 | Grubb | .................... | B23K 26/28 |
| | | | | | | 403/270 |

(Continued)

FOREIGN PATENT DOCUMENTS

| CN | 102834219 A | 12/2012 |
| CN | 103502656 A | 1/2014 |

(Continued)

OTHER PUBLICATIONS

German-language European Office Action issued in counterpart European Application No. 15701195.8 dated Oct. 11, 2017 with English translation (Ten (10) pages).

(Continued)

*Primary Examiner* — Thien S Tran
(74) *Attorney, Agent, or Firm* — Crowell & Moring LLP

(57) ABSTRACT

A method is provided for producing a component connection. The method includes the following steps: provision of a first component consisting of a first material; welding of a ball or a ball-like element, which likewise consists of a first material, to the first metal sheet; provision of a second metal sheet, which consists of a second material that differs from the first; production of a throughhole in the second metal sheet, at least one edge section or the entire peripheral edge of the through-hole being bent over or upwards towards one side of the second metal sheet, thus forming at least one clamping collartype element; assembly of the two components such that the ball or ball-like element projecting from the first metal sheet is introduced sufficiently far into the (Continued)

through-hole from the side of the second metal sheet facing away from the at least one clamping collar-type element that the ball or the ball-like element projects at least partially out of the through-hole on the side of the at least one clamping collar-type element; and welding of the second metal sheet to the ball or the ball-like element and/or to the first metal sheet by the at least partial fusion of the at least one clamping collar-type element, such that fused second material flows into an undercut region between the first metal sheet and the ball or the ball-like element, thus producing an interlocking connection in addition to the bonded connection between the ball or the ball-like element and the second metal sheet and/or the first metal sheet.

15 Claims, 1 Drawing Sheet

(51) Int. Cl.
*F16B 5/06* (2006.01)
*B23K 26/32* (2014.01)
*F16B 5/08* (2006.01)
*B23K 26/242* (2014.01)
*B23K 26/03* (2006.01)
*B23K 101/00* (2006.01)
*B23K 103/20* (2006.01)
*B23K 101/18* (2006.01)
*B23K 103/00* (2006.01)

(52) U.S. Cl.
CPC ............ *B23K 26/32* (2013.01); *F16B 5/0642* (2013.01); *F16B 5/08* (2013.01); *B23K 2101/006* (2018.08); *B23K 2101/18* (2018.08); *B23K 2103/20* (2018.08); *B23K 2103/50* (2018.08); *F16B 5/0657* (2013.01)

(58) Field of Classification Search
USPC ............. 219/121.14, 121.64, 121.78, 121.83
See application file for complete search history.

(56) References Cited

U.S. PATENT DOCUMENTS

| | | | |
|---|---|---|---|
| 2004/0082145 A1 | 4/2004 | Reichenbach et al. | |
| 2007/0284341 A1 | 12/2007 | Gasquet et al. | |
| 2013/0036594 A1 | 2/2013 | Hammer et al. | |
| 2013/0269873 A1* | 10/2013 | Herzinger ............ | B62D 27/026 156/305 |
| 2014/0201959 A1 | 7/2014 | van Niekerk et al. | |

FOREIGN PATENT DOCUMENTS

| | | | |
|---|---|---|---|
| DE | 101 25 117 A1 | 5/2002 | |
| DE | 101 49 140 A1 | 4/2003 | |
| DE | 10 2010 028 322 A1 | 11/2011 | |
| DE | 10 2011 079 483 A1 | 1/2013 | |
| WO | WO 2012084090 A2 * | 6/2012 | ........... B62D 27/026 |

OTHER PUBLICATIONS

Chinese-language Office Action issued in counterpart Chinese Application No. 201580003097.4 dated Sep. 1, 2017 with English translation (Fifteen (15) pages).
International Search Report (PCT/ISA/220 & PCT/ISA/210) issued in PCT Application No. PCT/EP2015/051298 dated Jul. 10, 2015 with English translation (seven pages).
German-language Written Opinion (PCT/ISA/237) issued in PCT Application No. PCT/EP2015/051298 dated Jul. 10, 2015 (six pages).
Chinese Office Action issued in counterpart Chinese Application No. 201580003097.4 dated Dec. 16, 2016 with English translation (15 pages).

* cited by examiner

METHOD FOR PRODUCING A COMPONENT CONNECTION FROM TWO DIFFERENT MATERIALS, AND A CORRESPONDING COMPONENT CONNECTION

CROSS REFERENCE TO RELATED APPLICATIONS

This application is a continuation of PCT International Application No. PCT/EP2015/051298, filed Jan. 23, 2015, which claims priority under 35 U.S.C. § 119 from German Patent Application No. 10 2014 202 629.6, filed Feb. 13, 2014, the entire disclosures of which are herein expressly incorporated by reference.

BACKGROUND AND SUMMARY OF THE INVENTION

The present invention relates to a method for producing a component connection from two different materials, as well as to a component connection produced according to this method.

DE 10 2010 028 322 A1 discloses a method for connecting a first vehicle component to a second vehicle component. In DE 10 2010 028 322 A1, two vehicle components are, initially, detachably plugged together. For this purpose, a ball is attached to one of the two vehicle components and is inserted in a clamping manner into a hole provided in the other vehicle component. After the two vehicle components are plugged together, they are welded to provide a permanent connection.

It is an object of the invention to further improve the above-described method such a manner that the method is usable with as much versatility as possible and a component connection of particularly high strength arises.

This and other objects are achieved by the method for producing a component connection from two different materials, as well as by a corresponding component connection so produced, in accordance with embodiments of the invention.

The starting point of the invention is a method for producing a component connection, wherein first of all a sheet or plate composed of a first material is provided. The first sheet or plate can be, in particular, a steel sheet or plate. A ball or a ball-like element is welded onto the first sheet or plate. The ball is composed of the same material as the first sheet or plate, i.e., for example, of steel. Furthermore, a second sheet or plate which is composed of a second material differing from the first material, for example aluminum, is provided. A through hole is produced in the second sheet or plate, wherein at least one border portion or the entire encircling edge of the through hole is bent over toward one side of the second sheet or plate, as a result of which at least one clamping collar-type element protruding from the second sheet or plate is produced.

In a next step, the two sheets or plates are assembled, specifically in such a manner that the ball or the ball-like element protruding from the first sheet or plate is inserted from that side of the second sheet or plate which faces away from the at least one clamping collar-type element into the through hole. The ball or the ball-like element is inserted into the through hole until the ball or the ball-like element at least partially projects out of the through hole on the side of the at least one clamping collar-type element.

The essence of the invention consists (in particular also as a delimitation with respect to DE 10 2010 028 322 A1 mentioned at the beginning) in that the second sheet or plate is welded to the ball or to the ball-like element and/or to the first sheet or plate by at least partial or complete fusion of the at least one clamping collar-type element. The partial or complete fusion of the at least one clamping collar-type element leads, according to the invention, to fused second material flowing into an undercut region provided between the first sheet or plate and the ball or the ball-like element, i.e. into the lower region of the ball or the ball-like element, in which region the ball or the ball-like element is welded to the first sheet or plate. This results in a form-fitting connection in addition to the integrally bonded connection formed by the welded joint between the ball or the ball-like element and the second sheet or plate and/or the first sheet or plate. After the welding, the second sheet or plate or the weld seam arising from fused material bears intimately and directly in the undercut region against the ball or the ball-like element. There are preferably no cavities or air locks whatsoever between the second sheet or plate and the ball or the ball-like element and the first sheet or plate. In particular, the welding can take place in such a manner that the weld seam extends around the ball or the ball-like element, as a result of which a fluid-tight connection is produced between the second sheet or plate and the ball or the ball-like element.

According to a development of the invention, the two sheets or plates are assembled in a clamping manner such that the at least one clamping collar-type element presses from the outside against the ball or the ball-like element.

Furthermore, an adhesive or an adhesive layer can be introduced between the first sheet or plate and the second sheet or plate (e.g., in a space indicated as numeral 13 in FIG. 1). A region around the ball or the ball-like element (e.g., in a space indicated as numeral 15 in FIG. 1) should preferably remain free of adhesive. In particular, adhesive should not be applied in regions in which the first or second sheet or plate becomes very hot during the welding since this could lead to burning of the adhesive. For example, provision may be made for no adhesive to be introduced between the first and the second sheet or plate within a range of 2, 3, 5, 10, 15, 20, 25, 30, 35 or 40 mm around the ball or the ball-like element.

According to a development of the invention, the welding takes place in such a manner that the second sheet or plate merges smoothly via a peripherally smooth weld seam into the spherical or ball-like element. In particular, provision may be made for the weld seam to extend uniformly around the entire ball or the ball-like element, wherein the weld seam can be point-symmetrical with respect to a normal which runs through the center point and through the contact point of the ball or the ball-like element first sheet or plate.

As already mentioned, the invention is suitable in particular for what are referred to as mixed construction connections, i.e. for component connections in which the first component is composed of a different material from the second component. For example, the first component can be composed of steel and the second component of aluminum. In this context, the term "aluminum" comprises both pure aluminum and also aluminum alloys. The clamping collar-type element(s) of the second component, composed, for example, of aluminum, are therefore fused during the welding.

A further aspect of the invention consists in that the welding takes place in a contact-free manner by use of an electronically controlled welding apparatus arranged at a distance from a spherical or ball-like element, in particular by means of a laser welding apparatus. Remote laser welding of this type has the advantage that no welding tool whatsoever has to be brought directly up to the welding point, i.e. into the region of the ball or the ball-like element. Remote laser welding therefore makes it possible to produce high-strength and qualitatively high-value "mixed construction connections" in a simple manner even at component regions to which access is comparatively difficult, which permits diverse use possibilities for the invention, in particular also in the manufacturing of vehicle bodies.

According to a development of the invention, the position of the spherical or ball-like element in space is detected in a contactless manner by way of an electronic measuring device, in particular by means of an optoelectronic measuring device. Owing to the spherical shape of the "connecting element", in comparison to all other (nonspherical) component geometries, a particularly simple optoelectronic determination of the center point of the spherical or of the ball-like element is possible. The data supplied by the measuring device regarding the geometry or position of the spherical or ball-like element can be made available in particular to the welding apparatus or to control electronics of the welding apparatus. The welding apparatus can accordingly be controlled depending on the measured position data.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
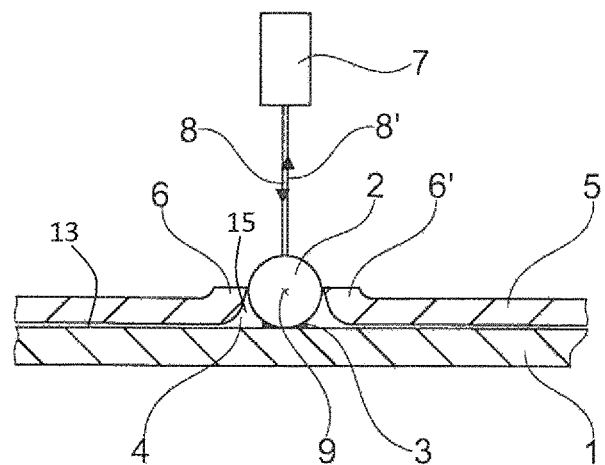
FIG. 1 is a partial cross-sectional view of a component connection according to an embodiment of the invention prior to the welding.

FIG. 1 shows a first sheet or plate 1 which can be, for example, a steel sheet or plate. A ball or a ball-like element 2 is welded onto the first sheet or plate 1. The welded joint between the first sheet or plate 1 and the ball or the ball-like element 2 is identified by the reference number 3. The ball or the ball-like element 2 is composed of the same material as the first sheet or plate 1.

A second sheet or plate 5 provided with a through hole 4 is placed onto the first sheet or plate 1. The second sheet or plate 5 is composed of a different material from the first sheet or plate 1 and the ball or the ball-like element 2. For example, the second sheet or plate 5 is composed of aluminum or an aluminum alloy.

An edge of the second sheet or plate 5 is bent over or upward or bent up. The edge 6 can be bent over or bent up peripherally or at points spaced apart from one another in the circumferential direction, thus resulting in an encircling clamping collar or in a plurality of clamping collar-type elements 6, 6' spaced apart from one another in the circumferential direction.

The through hole 4 and the clamping collar-type elements 6, 6' are dimensioned in such a manner that the clear width thereof is somewhat smaller than the diameter of the ball or of the ball-like element 2.

The second sheet or plate 5 is placed onto the first sheet or plate 1 in such a manner that the ball or the ball-like element 2 is inserted from that side of the second sheet or plate 5 which faces away from the clamping collar-type elements 6, 6' into the through hole 4. The diameter of the ball or of the ball-like element 2 and the clamping collar-type element 6, 6' and the thickness of the second sheet or plate 5 are coordinated with one another in such a manner that the ball or the ball-like element 2 protrudes for at least a distance out of the through hole 4. The clamping collar-type elements 6, 6' press here from the outside against the ball or the ball-like element, as a result of which the latter is fixed in a clamping manner on the second sheet or plate.

The position of the ball or of the ball-like element can be determined in a simple manner by use of an optoelectronic measuring system 7, for example by way of a camera and suitable evaluation electronics. By exposing the ball or the ball-like element 2 to light at different points, in every conceivable orientation of the optoelectronic measuring system 7 there is precisely one relative position at which a light beam impinging on the ball or the ball-like element 2 is totally reflected, i.e. at which the light beam 8 extending to the ball or the ball-like element 2 coincides with the reflected light beam 8'. The center point 9 of the ball or of the ball-like element 2 has to lie, of course, on an "extension" of the beams 8 or 8'. In this manner, if the diameter of the ball is known, the position of the ball center point and therefore of the entire ball in space can be determined in a simple manner.

In a next step, a welded joint is produced in a contactless manner by way of a welding apparatus 10 (remote laser welding apparatus), which is arranged away from the ball or the ball-like element 2, using the measured position data of the ball or of the ball-like element 2. The clamping collar-type elements 6, 6', or in the event of an encircling clamping collar, the encircling clamping collar and/or part of the ball or of the ball-like element 2 and/or part of the first component 1 are/is fused by use of the laser welding apparatus 10. An encircling, qualitatively extremely high-value, smooth weld seam if can thereby be produced in a very simple manner.

Figure 2:
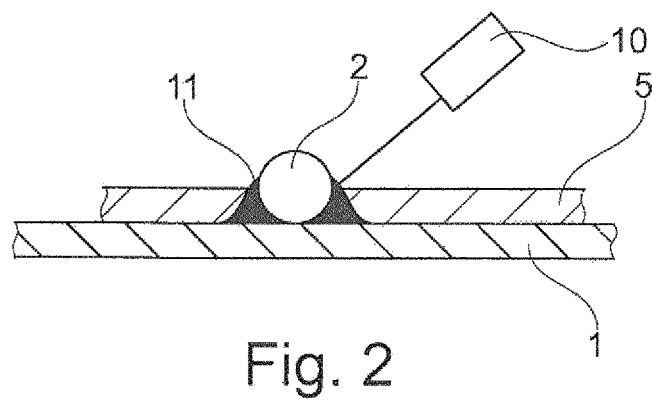
FIG. 2 is a partial cross-sectional view of a component connection after the welding.

As is apparent from FIG. 2, the weld seam 11 merges smoothly from the second component 5 into the ball or the ball-like element 2. Fused material of the second component 5 (clamping collar material) flows here into an undercut region located between the ball or the ball-like element 2 and the first sheet or plate 1. The undercut region is preferably completely filled with welding material, as a result of which a fluid-tight connection is produced between the second sheet or plate 5 and the ball or the ball-like element 2.

Since the fused material of the second sheet or plate 5 and/or of the ball or the ball-like element 2 and/or of the first component 1 flows into the undercut region and preferably completely fills the latter, a form-fitting connection is produced in addition to the integrally bonded connection formed by the welded joint. In this manner, very high strength can be obtained even in the case of "mixed construction connections", i.e. in the case of component connections in which the two components are composed of different materials.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:

providing a first sheet or plate which is composed of a first material;

welding a ball or a ball-like element, which is also composed of the first material, onto the first sheet or plate;

providing a second sheet or plate which is composed of a second material differing from the first material;

producing a through hole in the second sheet or plate, wherein at least one edge portion or an entire encircling edge of the through hole is bent over or up toward one side of the second sheet or plate, as a result of which at least one clamping collar element is produced;

assembling the first and second sheets or plates in such a manner that the ball or the ball-like element protruding from the first sheet or plate is introduced from a side of the second sheet or plate which faces away from the at least one clamping collar element into the through hole until the ball or the ball-like element at least partially projects out of the through hole on a side of the at least one clamping collar element; and welding the second sheet or plate to the ball or to the ball-like element and/or to the first sheet or plate by at least partial fusion of the at least one clamping collar element such that fused second material flows in an undercut region provided between the first sheet or plate and the ball or the ball-like element, and therefore a form-fitting connection is produced in addition to an integrally bonded connection between the ball or the ball-like element and the second sheet or plate and/or the first sheet or plate, wherein a region around the ball or the ball-like element remains free from adhesive.

2. The method according to claim 1, wherein the first and second sheets or plates are assembled in a clamping manner such that the at least one clamping collar element presses from outside against the ball and/or the ball-like element.

3. The method according to claim 1, wherein an adhesive layer is introduced between the first sheet or plate and the second sheet or plate.

4. The method according to claim 1, wherein the ball or the ball-like element is connected fluid-tightly to the second sheet or plate by the welding.

5. The method according to claim 1, wherein the welding takes place such that the second sheet or plate merges smoothly peripherally via a weld seam into the ball or ball-like element.

6. The method according to claim 5, wherein the weld seam extends uniformly around the entire ball or the ball-like element, wherein the weld seam is point-symmetrical with respect to a normal which runs through a center point and a contact point of the ball or of the ball-like element on the first sheet or plate.

7. The method according to claim 1, wherein the first material is a steel.

8. The method according to claim 7, wherein the second material is aluminum or an aluminum alloy.

9. The method according to claim 1, wherein the second material is aluminum or an aluminum alloy.

10. The method according to claim 1, wherein a weld seam is produced in a contact-free manner by an electronically controlled welding apparatus arranged at a distance from the ball or ball-like element.

11. The method according to claim 10, wherein the welding apparatus is a laser welding apparatus.

12. The method according to claim 1, wherein a position of the ball or ball-like element in space and/or relative to the first and/or to the second sheet or plate is detected in a contactless manner by an electronic measuring device.

13. The method according to claim 12, wherein the electronic measuring apparatus is an optoelectronic measuring device.

14. The method according to claim 12, wherein the measuring device of the welding apparatus provides information describing the detected position of the ball and of the ball-like element.

15. A component comprising:

a first sheet or plate which is composed of a first material;

a ball or a ball-like element which is also composed of the first material and welded onto the first sheet or plate;

a second sheet or plate which is composed of a second material differing from the first material, wherein a through hole is provided in the second sheet or plate, and at least one edge portion or an entire encircling edge of the through hole is bent over or up toward one side of the second sheet or plate, as a result of which at least one clamping collar element is produced, wherein the first and second sheets or plates are assembled in such a manner that the ball or the ball-like element protruding from the first sheet or plate is introduced from a side of the second sheet or plate which faces away from the at least one clamping collar element into the through hole until the ball or the ball-like element at least partially projects out of the through hole on a side of the at least one clamping collar element, and the second sheet or plate is welded to the ball or to the ball-like element and/or to the first sheet or plate by at least partial fusion of the at least one clamping collar element such that fused second material flows in an undercut region provided between the first sheet or plate and the ball or the ball-like element, and therefore a form-fitting connection is produced in addition to an integrally bonded connection between the ball or the ball-like element and the second sheet or plate and/or the first sheet or plate;

wherein a region around the ball or the ball-like element remains free from adhesive.

* * * * *